Feb. 24, 1970  K. R. LARSON  3,496,767
TORQUE MEASURING WRENCH OF THE TORSION TYPE
Filed Nov. 27, 1967
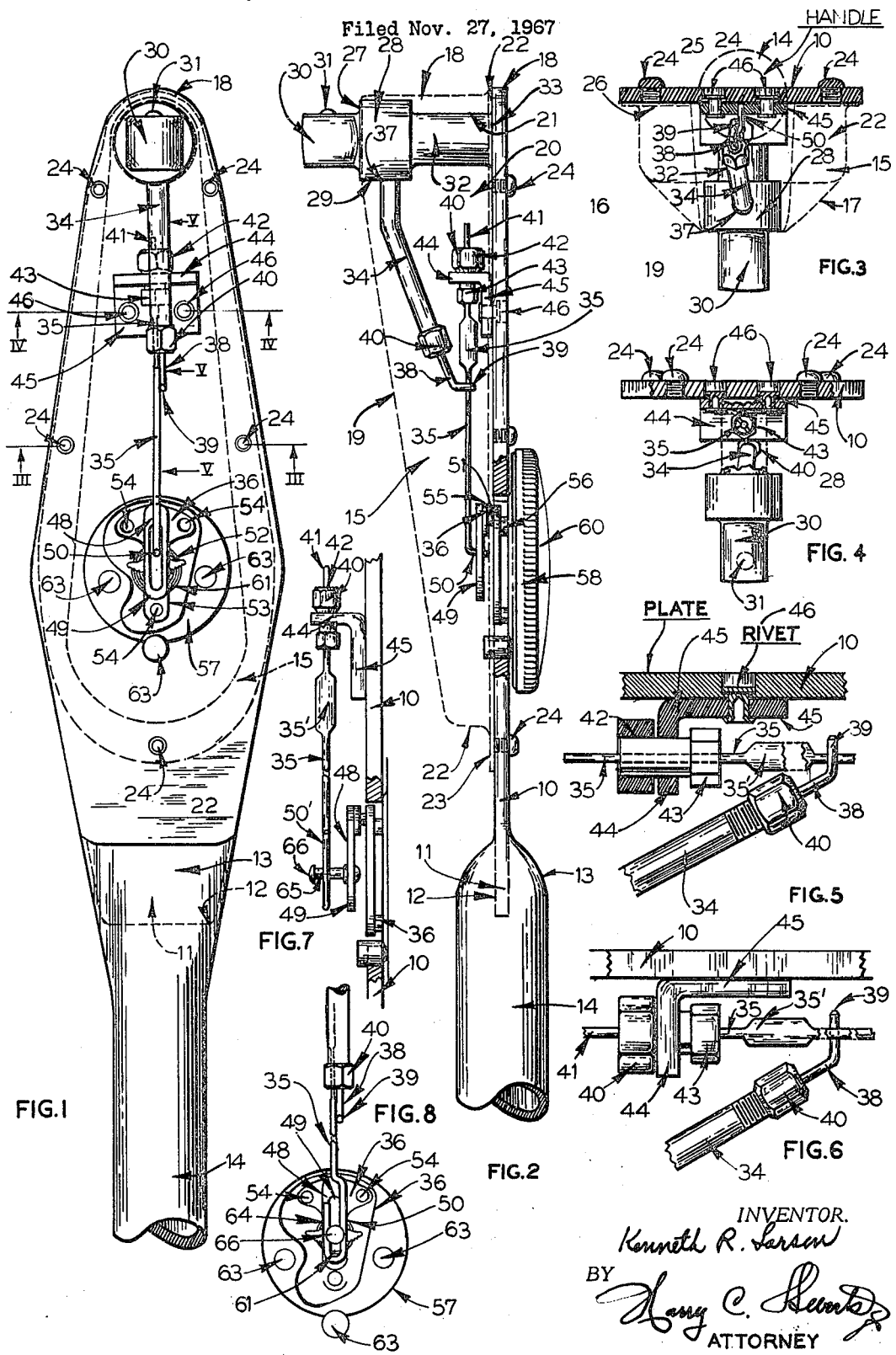
INVENTOR.
Kenneth R. Larson
BY
Harry C. ~~~~
ATTORNEY United States Patent Office 3,496,767
Patented Feb. 24, 1970

3,496,767
TORQUE MEASURING WRENCH OF THE
TORSION TYPE
Kenneth R. Larson, Des Plaines, Ill., assignor to Snap-On Tools Corporation, Kenosha, Wis., a corporation of Delaware
Filed Nov. 27, 1967, Ser. No. 685,882
Int. Cl. G01l 5/24
U.S. Cl. 73—139                         7 Claims

ABSTRACT OF THE DISCLOSURE

A torque measuring wrench of the torsion type wherein the work engaging member and the calibrated measuring instrument are in operative connection through longitudinally adjustable elongated translating elements tensioned against each other.

---

This invention relates to turning devices and more particularly to torque measuring wrenches of the torsion type disclosed in my U.S. Letters Patents Nos. 2,312,104 dated Feb. 23, 1943; 2,682,796 dated July 6, 1954; 2,715,-333 dated Aug. 16, 1955 and 3,069,903 dated May 31, 1966, although certain features thereof may be employed with equal advantage for other purposes.

It contemplates more especially the provision of more simple, dependable, and accurate torque measuring wrenches that accurately designate the force applied in nut turning and similar movements under all conditions.

Most torque wrenches measure the flex in a beam which resists the turning force of a wrench in order to measure the amount of torque or force applied in nut turning and similar operations. Then, too, the amount of torque has been measured by determining the degree of twist in a shank or shaft.

The importance of accuracy in torque wrenches cannot be over-emphasized, and the degree of accuracy depends largely upon the elimination of or substantial reduction in fatigue, friction, lag and free-play between relatively moving parts. This is also important in torque wrenches that embody the principle of flexing a torque resisting beam to provide the desired reading; however, better results have been found possible in torsion type wrenches embodying teachings of the present invention.

In accordance with the teachings of the present invention, the torsion measuring principle has been embodied in the conventional type lever-arm wrench with minimum fatigue, friction, lag, free-play, and maximum translation of the relative twist of the load carrying member. Torque measurements are possible, therefore, with minimum fatigue, a negligible error factor and nut turning operations are more accurately measured under all conditions and capacities irrespective of the position of applied force along the lever-arm for effecting the turning operation.

One object of the present invention is to simplify the construction and improve the operation of devices of the character mentioned.

Another object is to provide a simple and improved torque measuring wrench of the lever-arm type that is more accurate, dependable and subject to less fatigue in operation over an extended period of time.

Still another object is to provide a torque measuring turning tool having improved torsion translating means associated therewith for measuring the torque applied in the turning operation with less fatigue and within a range that is substantially below its adjustable capacity.

A further object is to provide a turning tool with a shank subjected to twist for operating measuring instrumentalities with more effective twist translating instrumentalities for greater accuracy, dependability, and increased capacity.

A still further object is to provide a torque wrench with a turning shank having comparatively long inter-engaging twist translating rods tensioned against each other and extending therefrom for operative connection to measuring instrumentalities at a point of accentuated displacement.

Still a further object is to provide a wrench having a rigid casing element for the journalled mounting of a turning shank subjected to rotary work imparting movement to provide a calibrated twist therein through the medium of light, flexible, and elongated inter-tensioned rods which are operatively connected to measuring instrumentalities at a point of greatest displacement responsive to torsional shank stresses and strains.

Other objects and advantages will appear from the following description of an illustrative embodiment of the present invention.

In the drawings:

FIGURE 1 is an interior plan view of a wrench embodying features of the present invention, the casing being removed to clarify the showing.

FIGURE 2 is an edge view in elevation of the wrench shown in FIGURE 1 with the casing shown in dotted outline.

FIGURE 3 is a fragmentary sectional view of the wrench taken substantially along line III—III of FIGURE 1, part of the casing being broken away for clarity of illustration.

FIGURE 4 is a fragmentary sectional view taken substantially along line IV—IV of FIGURE 1.

FIGURE 5 is an enlarged fragmentary sectional view taken substantially along line V—V of FIGURE 1.

FIGURE 6 is an enlarged fragmentary side view in elevation of the oppositely tensioned counteracting translating rods shown in section in FIGURE 4.

FIGURE 7 is a side fragmentary view in elevation of a modified connector between the tensioned translation rod and the meter mechanism.

FIGURE 8 is a fragmentary plan view of the modified meter mechanism connector shown in FIGURE 7.

The structure selected for illustration is not intended to serve as a limitation upon the scope or teachings of the present invention, but is merely illustrative thereof. There may be considerable variations and adaptations of all or part of the teachings thereof depending upon the dictates of commercial practice. The present invention comprises a solid elongated plate handle member 10 preferably though not essentialy of flaring diamond-shaped conforming configuration and construction having its end fitted into and anchored by welding into a complemental slot 12. The slot 12 is in the flared and rounded handle end 13 of an elongated solid hand grasping handle shank 14 constituting an extension of the plate number 10 which complementally serves as a manual turning torque applying handle member. The handle 10 with its chambered body 15 is preferably although not essentially cast or otherwise shaped from an aluminum alloy or steel so as to possess the desired strength and lightness for convenience and manipulation in nut turning as will appear more fully hereinafter.

It will be observed that the body casing 15 consists of the inclined side walls 16–17 which converge in the direction of the outer and corner ends of the plate 10 to merge with handle extension 14 as well as toward the bottom wall 19 formed integral therewith to define an elongated chambered interior 20. It should be noted that, in this instance, the side walls 16–17 not only converge toward the plate 10 (FIGURES 1 and 3) but also toward the bottom 19 (FIGURES 2 and 3) to define a compact and well balanced casing or body 15.

The casing body 15 is, in this instance, covered by the rigid steel plate 10 that is shaped to conform with the configuration of the peripherally flanged open side casing edge 21 opposite the bottom wall 19 to confront therewith and serve as a complement thereof. The lower or handle extremity 22 (FIGURE 2) of the casing chamber 20 is of the same general size and semi-circular configuration as the head extremity 18–18′. The peripherally flanged open edge 21 of the casing 15 extends around the side walls 16–17 and their semi-circular head and handle extremities 16–17 which is flanged as at 23 to enable its attachment to the handle plate member 10 to constitute part of the casing peripheral flanged open edge 21. The rigid face or cover handle plate 10 is shaped to correspond with the flanged open edge 22–23 including its upper and lower circularly shaped heads 18–22 to serve as an enclosure for a substantial portion of the plate handle member 10 which serves as a rigid turning arm to which the measuring instrumentalities are attached as will appear more fully hereinafter.

A plurality of threaded screw fasteners 24 project through threaded apertures 25 in the rigid cover plate 10 to engage correspondingly threaded bores 26 in the peripheral casing edge 21 that extends along the side walls 16–17 of the handle shank or casing body 15 and circularly curved ends 18–22, thereby enclosing the chamber 22 and confining the torsion displacing, indicating, and measuring instrumentalities to be described hereinafter. It will be noted that the casing body 15 with its inclined side walls 16–17 and curved ends 18–22 are effectively attached and secured in the region of the threaded bores 26 by means of the uniformly spaced and peripherally attached threaded stud fasteners 24 so that the comparatively rigid and load carrying cover handle plate 10 can be effectively attached to the casing body 15 which is greatly strengthened and reinforced therewith.

In fact, the casing 15 does not sustain any appreciable turning load and primarily serves to confine the measuring instrumentalities as a protection against foreign substances and impacts. The handle cover plate 10 is sufficiently rigid to avoid a flex, distortion or consequential yield under turning load. The semi-circular head 18 of the body 15 is provided with a circular recess 27 corresponding substantially in curvature therewith and sized to receive a revoluble turning member 28 of substantially corresponding size for free rotation therein. The revoluble turning member 28 has an annular shoulder 29 formed, in this instance, integral therewith immediately above a polygonal wrench socket receiving extremity 30 which terminates beyond the bottom 19 of the casing body 15 for projecting through the circular recess 27 provided in the head 18. A spring impelled detent 31 of standard construction is provided in a face of the polygonal shank 30 for cooperation with a correspondingly sized and shaped recess in a wrench socket or other turning implement that is telescoped thereon for retention against accidental detachment.

Wrench sockets or other turning implements (not shown) would normally be provided with a recessed shank complementally shaped and sized to conform with the polygonal extremity 30 of the revolvable turning member 28 so that the friction exerted by the spring impelled detent 31 would be effective in retaining the turning implement thereon against accidental removal. As shown, the revolvable member 28 has a cylindrical extension 32 constituting a turning shank which, in this instance, is formed integral with the annular shoulder 29 and polygonal shank 30 in axial relation therewith. The cylindrical turning shank 32 terminates in an enlarged oblong or otherwise polygonally shoulder 33 for registry with a correspondingly shaped aperture 40 provided in the head region of the cover plate 10. Obviously, the shoulder 33 may be of any polygonal shape depending upon the dictates of commercial practice, and this coupled with the welding thereof to the handle plate 10, serves to preclude relative movement therebetween and these parts function as an integral unit.

So that the revolvable turning member 28 may be rigidly attached to the cover plate 10, the latter is preferably of rigid and non-yielding material such as steel while the body or casing shank 11 may be cast or otherwise shaped from aluminum or stamped from sheet steel in that it carries no appreciable load and the revolvable turning member 28 is mounted for movement relative thereto in sustaining the turning load. The casing 15 does not, therefore, directly carry any appreciable load. Turning movement is imparted to a fastener such as a threaded nut through a wrench socket attached to the polygonal shank 30 of the revolvable turning member 28, responsive to manually applying force or effort to the handle 10–14 in one direction or another.

In order to measure the extent to which any fastener such as a threaded nut is applied through the manipulation of the handle 10–14, the extent of twist sustained by the cylindrical extension 32 of the revolvable turning member 28 is determined in that this will be uniform for any predetermined applied force and will vary proportionately to the turning load imparted through the handle 10–14 that is primarily sustained by the rigid cover plate 10. It will be observed that owing to the polygonal shoulder 33 on the revolvable member 28 and the attachment thereof to the cover plate 10 through the medium of the fasteners 24, any turning movement applied to the handle 10–14 will be transferred to the cover plate 10 which, in turn, will displace the revolvable turning member 28 which carries a nut or other turning implement to the end that proportional twist is imparted to the cylindrical extension 32 anchored to the cover plate 10 at one extremity 33 and free to twist at the other extremity 30 responsive to carrying the turning load.

In order to measure the degree of twist or torsion imparted to the cylindrical extension 32 of the revolvable member 28 responsive to any turning operation, a pair of inter-engaging and interacting elongated cylindrical twist translating and displacing rods 34–35, is in this instance of some normal relative flexibility, extend between the work engaging shank shoulder 29 and the calibrated measuring instrumentalities 36 (FIGURE 1). The tubular rod 34 projects radially into the annular shoulder 29 of the revolvable member 28 as at 37 for fixed engagement to constitute an integral acting unit or member therewith. The elongated rod 34 is comparably rigid and tubular to telescopically receive a relatively smaller and somewhat flexible rod 38 having an angularly offset extremity 39 for disposition in the path of the other rod 35 for inter-engagement and interaction therewith as will appear more fully hereinafter. The telescopic rod 38 is friction engaged through a threaded standard friction nipple 40 with the tubular rod 34 for longitudinal adjustment relative thereto. The rods 34–38 projects longitudinally of the body or casing body 15 for confinement therein. So that the casing body 15 together with its associated instrumentalities may be as compact as possible, the tubular indicator displacing rod 34 is preferably disposed at an angle between the extremities 37 and 39 thereof (FIGURE 2) to avoid contact with either the bottom 19 or cover handle plate 10 and free to rotarily move or oscillate for a limited extent depending upon the degree of twist imparted to the revolvable member extension 29–32 or the torsion effect therein responsive to carrying the turning load and its polygonal shoulder 33.

The elongated indicator displacing rod 38 need only be heavy enough to overcome the friction in the measuring instrumentalities and the load occasioned by their operation without causing any flex in the rod itself as its offset extremity 39 is mounted therewith to be sprung against the rod 35 (FIGURE 1) in a clockwise engaging direction therewith. Its diametrical size, however, may be determined by other factors such as the elimination of backlash and conditions of abuse in actual nut turning operations. For that reason, the elongated rods 34–38–39 in actual practice may be somewhat heavier than otherwise required merely to carry a comparatively negligible load of operating the measuring instrumentalities without any unaccountable flex in the rod as it is maintained in interacting engagement with the other rod 35.

The other rod 35 is tensioned and sprung in a counterclockwise direction (FIGURE 1) against the first described rod offset 39. This is accomplished by mounting the outer end threaded region 41 of the rod 35 projecting through a two-piece friction nipple 42–43 engaging both sides of an upstanding bracket flange 44. The flange 44 extends upwardly from its other integral flange 45 which is attached to the under or interior side of the plate member 10 by means of suitable rivets 46, in this instance two. The normally flexible rod 35 is thus adjustably mounted in the bracket flange 44 which is preferably disposed at a slight counterclockwise angle to the normal plane of the longitudinal axis of the plate handle member 10, to correspondingly direct and tension the rod 35 against the other rod offset 39 in the path thereof (FIGURE 1).

With the rod 38 and its offset 39 sprung in a clockwise direction (viewed from FIGURE 1) and the interacting and engaging rod 35 sprung in a counterclockwise direction against the other rod offset 39, these two rods 34–38–39 and 35, are in tensioned inter-engagement and interact to function as a more or less rigid translating rod 34–38–39–35 which is extensibly adjustable to accurately preset the initial reading at the factory and to control the turning load wrench capacity. These rods 34–35 serve to translate the twist in the work engaging shank 30–28–32 to the measuring instrumentalities 36 as will appear more clearly hereinafter, and the normal operating range of the wrench can be maintained at substantially three-fourth more or less of capacity to insure greater accuracy at near capacity loads, minimum fatigue, and practically trouble free service ttherewith. The torsion translating rod 35 is preferably provided with a flattened portion 35' proximate to the head or forward end thereof and backwardly of the anchoring expedients 42–43–44 to resist any twisting tendencies therein and provide greater rigidity.

With this arrangement, the rod extension 38 may be extended or retracted within the axial bore of the rod 34, and the rod 35 can be lengthened or shortened by means of the flange engaging fasteners 42–43 relative to the instrument actuating lever 48 which is slotted as at 49 to provide for greater or lesser throw of the lever 48. This enables longitudinal adjustment of the rod 35 which has an offset extremity 50 disposed in the lever slot 49 operatively connected to the indicator mechanism to be hereinafter described. The longitudinal adjustment of the rods 34–38 and 35–50 will vary the extent to which the dial mechanism is actuated or displaced responsive to a predetermined torsional stress imparted to the shank 32 of the work engaging member 28 commensurate with any load imparted thereto.

This also enables the degree of contact to be adjusted at which the rod offset 39 engages the rod 35 therealong which controls the overload ratio of the wrench in relation to its prescribed limit rating. That is to say that a rated 150 foot pound wrench could be preset at the factory to say 250 foot pounds or in that range. Thus, this wrench would have heavier parts 28–32 and the reacting tensioned members 35–38 could be relatively adjusted so that their contact at 39 varied to provide corresponding readings of and for a 150 foot pound wrench, and the latter would always be operating well within its capacity for improved accuracy which is paramount in measuring instruments and provides more dependable service over a longer period. It should be noted that the interacting tensioned rods 35–48 function exactly as though such were integrally a part of the torsion translating member 28–32–34. However this would defeat all possible adjustability and presetting which is desirable and provided by the oppositely sprung interengaging coaxial rods 34–38–39–35–50 operatively connected to the measuring instrument for actuation by the twist imparted to the turning work engaging member 28 as a nut is being turned therewith in either direction.

The reduced rod extension 35 with its right angularly offset extension 50 which projects transversely within the circular casing body portion 27 near the center thereof, enables registry in the longitudinally elongated slot 49 provided in a lever 48 that comprises a part of measuring and indicating instrumentalities 36 to be presently described. The lever 48 is secured at one extremity thereof to a stub shaft 51 that carries a gear sector 52. The stub shaft 51 is journalled in a substantially T-shaped bracket 53 that is mounted by means of threaded studs 54, in this instance three, to the casing housing closure plate 10.

The gear sector 52 meshes with a pinion 55 mounted on a stud shaft 56 which is journalled between the substantially T-shaped bracket 53 and the housing closure plate 10. The pinion stud shaft 56 projects through the housing closure plate 10 and a dial casing plate 57 to carry an indicator pointer (not shown) attached thereto to confront a calibrated dial plate (not shown). The dial casing plate 57 has a calibrated dial plate attached thereto to designate in foot or inch pounds the degree of twist or torsional effect exerted on the revolvable work engaging member 28 while manual force is applied to the plate member handle 10–14. It should be observed that the offset extremity 50 of the rod 35 will be displaced within the elongated slot 49 of the dial mechanism lever 48 responsive to longitudinally adjusting the rod 35 relative to the rod mount 42–43–44. This variation in the position of the rod offset 50 within the slot 49 of the lever 48, will enable the correct setting or resetting of the dial mechanism for any particular load. This coupled with the adjustable points 39 of inter-engagement between the oppositely sprung and tensioned rods 34–38–35–50 will insure accuracy by the simple adjustment and capacity presetting through different tensioning application of the rod 35–39 relative to the rod 35.

The calibrated dial is confined within a narrow dial ring 58 (FIGURE 2) which cooperates with the dial casing plate 59 to constitute an exterior confining member for the pinion shaft 56, the indicator pointer and the calibrated dial (not shown). A suitable transparent dial cover 60 is secured to the dial casing ring 58 to confine and serve as protection for the dial indicator and the calibrated dial (not shown). The measuring instrumentalities described herein are returned to their initial position after the revolvable turning member 28 has been released from its load or nut turning operation, by means of a small spiral spring 61 that envelops the pinion and indicator carrying shaft 56 to normally urge or return the indicator instrumentalities to initial position.

The measuring instrumentalities which are assembled as a unit to a dial casing plate 57 are axially attached to the exterior handle cover plate 10 which is provided, in this instance, with a plurality of apertures 63, in this instance three, for receiving threaded studs therethorugh to engage correspondingly spaced and threaded apertures (not shown) provided in the casing plate 57. Consequently, the measuring and indicator mechanism can be attached to the cover handle plate 10 together with the revolvable member 28 and its torsion displacing rod 34–35. The cover handle plate 10 together with these instrumentalities are, in turn, attached for confinement in the chamber 20 of the casing body 15 by means of fasteners such as the threaded studs 24. It will be apparent from the foregoing arrangement of parts that a manual turning force applied to the handle 10–14 will impart a corresponding turning effect to the revolvable turning member 28. This creates a slight twist in the turning member extension or shank 32 which can be measured with the advantage procured through the moment arm dial indicator displacing members 34–35 therebetween. These latter displacing members 34–35 are oppositely sprung against each other for tensioned mounting and operation in either direction, since if the rod 34-38 is displaced in a counterclockwise direction (viewed from FIGURE 1), the rod 35 will follow owing to its initial tensioned engagement with the rod offset 39 in the path thereof. This tensioned and oppositely sprung interengagement is maintained at all times so that they function as a single but adjustable translating rod having relatively slidable parts 34-35 for compound adjustment (1) for changing the initial zero reading and (2) for presetting the over capacity of the wrench.

This turning operation is transmitted to a suitable fastener or tool or implement or fastener such as a threaded nut which require a predetermined turning load in securing it to the desired degree of tightness for the suitable performance of its intended function. This turning movement and sustained turning load wil create a fractional twist in the revolvable member shank or extension 32 between its annular shoulder 28 and the polygonal stationary shoulder 33. This fractional twist created by the torsional effect on the cylindrical extension 32, will be translated to the measuring instrumentalities culminating in the rotary displacement of the pointer (not shown) underneath the transparent crystal 60 relative to the confronting calibrated dial through the medium of the elongated rod 34-35. The degree of twist or torsional strain within the turning member shank 32 is measured at the extreme end 50 of the elongated rods 34-35 which is the point of its greatest displacement.

As a result, the rods 34-35 will accentuate the twist created in the revolvable head extension 32 to effect its return to the indicator pointer to an extent proportional to the length of the elongated rod 34-35. The measurement of the twist imparted to the revoluble head extension 32 at a point of maximum displacement of the comparatively long twist-translating rods 34-35 is an important factor in producing accurate readings. Then, too, the rods 34-35 need only be heavy enough to overcome the comparatively negligible force required to actuate the measuring instrumentalities so that comparatively little friction is encountered between the revolvable turning member 28 and the measuring instrumentalities. This is conducive to accuracy accomplished with utmost simplicity in construction and operation with a wide range of adjustment for two separate purposes (1) initial reading at no load setting and (2) overload preset for more dependability in operation over an extended period of time. The displacement of the parts in such an underloaded wrench is appreciably less and wear is reduced to a minimum.

It is worthy of note that with the rods 34-35 comprising independent interacting and interengaging members sprung oppositely to each other and tensioned together, they function as a single translating rod. With the extensible rod 38 and its offset extremity 39 adjustable along the rod 35, the maximum measuring capacity may be varied so that one wrench size may be utilized for different capacities. This enables the manufacturer to reduce the inventory of sizes which is an appreciable advantage and, further, a given capacity wrench or other turning device can be provided with a range of operation appreciably below the adjusted maximum so that normal operation would be within substantially lower limits to insure trouble free accuracy over an extended life of usefulness. Further, the rod 35 is displaceable through the adjustment nipples 42-43 on both sides of the bracket flange 44, so that the rod offset 50 is variously positioned in the meter lever slot 49 to correct for errors and inaccuracies. This twofold adjustment of the interacting rods 35-38, provides a wide range of multiple adjustment to afford greater versatility and more effective operation.

Should the handle 10 be abruptly released or the turning load should fall by virtue of a rupture in the nut or bolt or other instrumentality that is being tightened, the rather flexible rods 35-38 would absorb a substantial part of the shock without permitting such to damage the dial mechanism or any part thereof under abnormal conditions of abrupt release. Then, too, the pointer (not shown) is frictionally mounted on the stud shaft 56 for rotation relative to or therewith so that injury thereto would be avoided should such circumstances of operation prevail at anytime.

With the arrangement of parts above described, it will be apparent that a very simple, inexpensive and highly accurate torque measuring wrench has been provided wherein there are few moving parts, ready adjustment is possible at the factory to insure correct readings upon delivery, and to afford the use of the same turning device for different capacities. These features coupled with the fact that the torsional stress created by the turning load is measured at the point of maximum displacement of the elongated dial mechanism actuator rod, eliminates or reduces to a negligible minimum any inaccuracies even at small loads. The oppositely sprung and constantly maintained tension between the twist translating rod sections 35-38, provides maximum adjustment and accuracy within different ranges well below the capacity of the mechanism. This insures longer, more useful, and improved dependability over an extended period of use attendant with minimum maintenance problems.

In the modified embodiment shown in FIGURES 7 and 8, the translation rod 35 has its end 50' deformed into a reversely bent elongated and longitudinally extending open slot formation 64 to receive a threaded stud 65 which extends through the slotted translating rod end slot 64 for adjustable connection therealong. The threaded stud 65 has an enlarged head 66 to retain such against removal from the slotted end formation 64 of the translation rod 35. The stud 65 threadedly engages a threaded friction cup 67 that slides along the elongated slot 49 of the actuator segment 48. The actuator segment 48 of the measuring meter instrument 58 controls the displacement of the calibrated elements thereof, and a simple additional or substitute adjustment for the friction nipples 42-43 is provided to enable the rod 35 to be lengthened or shortened. This feature may be dispensed with when using the stud 65 that threadedly engages the friction cup 67 for retaining it in any adjusted position along the gear sector slot 49 of the measuring instrumentalities.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a torque measuring turning device, the combination with a handle member, of a torsion resisting work engaging head member operatively connected to said handle member, calibrated measuring instrumentalities on said handle member in spaced relation to said torsion resisting work engaging head member, and opposed interacting twist translating elements tensioned against each other, said interacting twist translating elements being interposed between said work engaging head member and said calibrated measuring instrumentalities to render the latter commensurately responsive to the twist in said work engaging head member to measure the applied turning force to said handle member.

2. The torque measuring turning device defined in claim 1 wherein said interacting twist translating elements comprise limitedly flexible elongated members extending in the same general direction between said head member and said calibrating measuring instrumentalities and sprung oppositely against each other to function as tensioned inter-engaging translating elements.

3. The torque measuring turning device defined in claim 2 wherein said interacting twist translating elements include means for adjusting the relative point of confronting engagement therebetween.

4. The torque measuring turning device defined in claim 3 wherein each of said interacting twist translating elements have independent adjusting means relative to each other and said calibrated measuring instrumentalities.

5. The torque measuring turning device defined in claim 1 wherein the interacting twist translating elements are adjustably tensioned relative to each other to maintain their relative interengagement in opposite directions of turning said handle member.

6. The torque measuring turning device defined in claim 4 including means for adjusting the effective point of interengagement between said translating elements to vary the capacity of the torque turning device.

7. The torque measuring turning device defined in claim 1 wherein said interacting twist translating elements comprise laterally flexible elongated elements in confronting oppositely sprung engagement to serve as an elongated flexible translating member in either direction of applied force to said handle member.

References Cited

UNITED STATES PATENTS

| | | | |
|---|---|---|---|
| 2,312,104 | 2/1943 | Larson | 73—139 |
| 2,715,333 | 8/1955 | Larson | 73—139 |
| 3,079,785 | 3/1963 | Livermont | 73—1 |
| 3,367,178 | 2/1968 | Tell et al. | 73—141 |

CHARLES A. RUEHL, Primary Examiner